United States Patent [19]
Goldhofer

[11] 3,726,421
[45] Apr. 10, 1973

[54] LOADING AND UNLOADING DEVICE

[76] Inventor: Alois Goldhofer, D 894 Memmingen, P.O. B. 297, Amendingen, Germany

[22] Filed: Sept. 10, 1971

[21] Appl. No.: 179,475

[30] Foreign Application Priority Data

Sept. 17, 1970 Germany.....................P 20 46 057.5
Aug. 20, 1971 Germany.....................P 21 41 774.3

[52] U.S. Cl. ................................214/77 R, 212/8 R
[51] Int. Cl. ..............................................B60p 1/48
[58] Field of Search........................214/77 R, 78, 80, 214/130, 765; 212/8, 8 A

[56] References Cited

UNITED STATES PATENTS 3,606,044   9/1971   Goldhofer..........................214/77 R
3,616,949   11/1971  Klaus.................................214/77 R Primary Examiner—Robert J. Spar
Attorney—Sherman Levy

[57] ABSTRACT

A loading and unloading device is located at each end of a load-carrying vehicle. Each such device consists of a pair of telescoping booms hinged together at their upper ends and hinged to the vehicle body at their lower ends, a telescoping support boom hinged to the other booms at its upper end and to the vehicle body between the booms at its lower end, a double ended lever pivotally mounted intermediate its end at the upper hinge point, and power means attached to one end thereof to cause the other end to pivot, to thereby move a load attached thereto.

29 Claims, 22 Drawing Figures

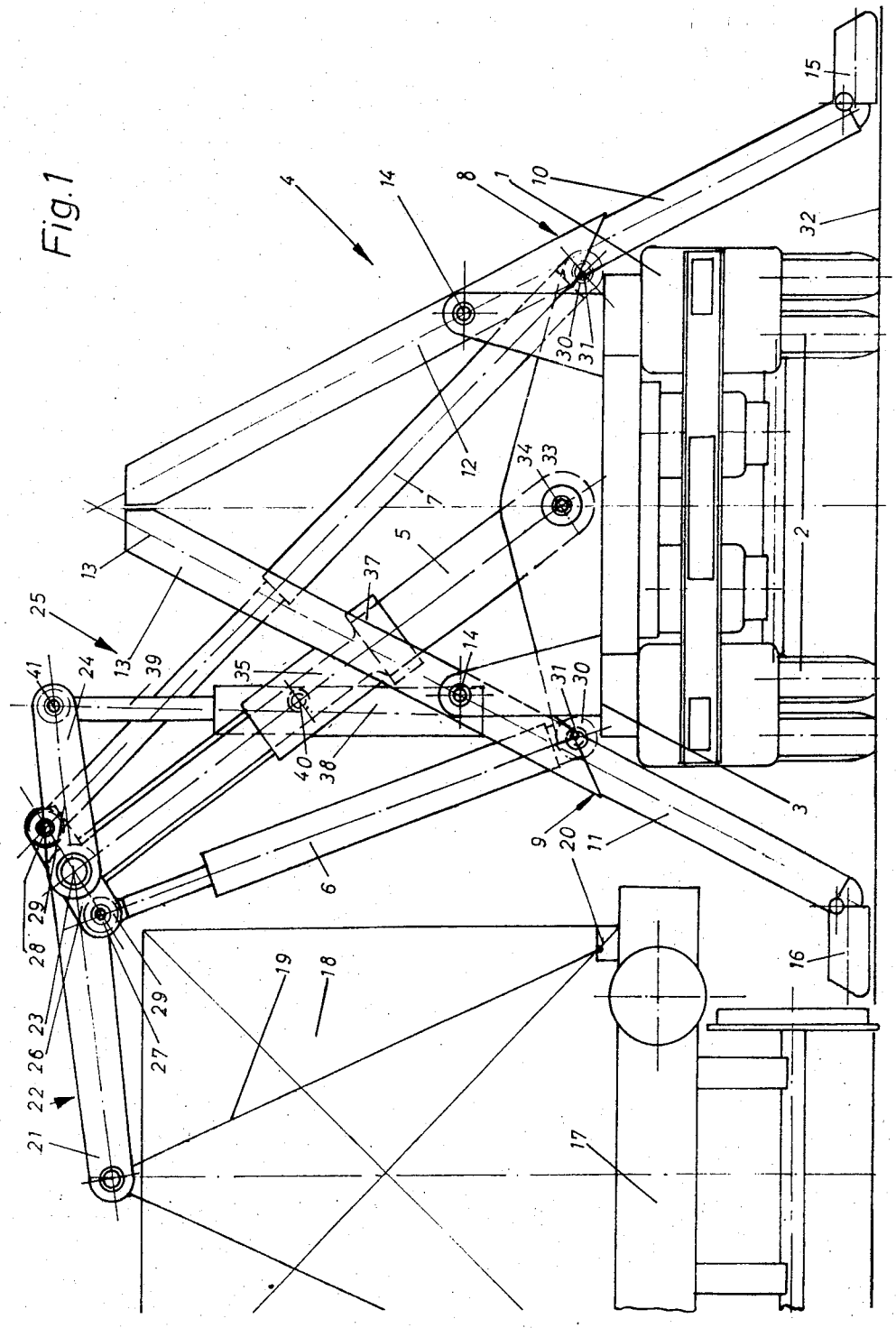

LOADING AND UNLOADING DEVICE

The present invention relates to a loading and unloading device for bulky parts, for instance finished structural parts, large containers, and other heavy loads, the said device consisting of loading and unloading devices arranged in front of and behind the load on the loading surface of a transporting vehicle, especially a road vehicle.

It has already been proposed to make these loading and unloading devices out of two telescoping booms each, the upper ends of the said booms being hinged together to take the load, while the lower ends thereof are hinged, to the longitudinal sides thereof, facing each other in a plane perpendicular to the longitudinal axis of the vehicle. At the hinge points telescoping supporting rails are also hinged to allow them to be swung out for the purpose of supporting the vehicle from the ground. Also provided was a telescoping supporting tube which was hinged to the joint between the booms and to the loading surface therebetween.

In order to eliminate the disadvantages of this arrangement, better ground support was provided for the loading and unloading device, which also made it possible to pick up a load on one side, to swing it round to the other side, and to lower it down, without having to put the load down on the way round.

In the previous design, the load had to be put down on the way round. The faster operation now saves time.

It is possible in this way to simplify the loading and unloading operation and, more particularly, to stack loads and to remove loads from an area where other loads have been placed in front of and behind them.

There is a wide variety of possible ways of joining the displacing device to the booms and the supporting tube.

In one form of the invention, a displaceable bearing bracket for the displacing device is fitted at the center line of the supporting tube, a guide tube being located at the lower end thereof, and surrounding the said supporting tube; the latter transfers the compression loads.

This construction ensures that the movement of the displacing device is not obstructed by the movement of the booms and the supporting tube. This makes possible, in each position of the booms, a movement of the displacement device and the double-ended lever independent of the said position of the booms.

It is advisable for the displacement device to engage with the shorter arm, i.e., the power arm of the double-ended lever, and for the load to be attached to the longer arm, i.e., the load arm. This makes it possible for the pivoting cylinder to have a shorter stroke.

In another advantageous construction, the upper end of the supporting tube is hinged to a head, to the two ends of which are hinged to the upper ends of the booms, the double-ended lever being hinged therebetween, advantageously in the middle.

In addition to a satisfactory attachment of the double-ended lever, from the point of view of load transfer, this also improves the adjustability of the booms; should it be necessary to assure a specific amount of travel, and head may, of course, be made to telescope.

The load and/or power arms of the double-ended lever may also be made to telescope.

This produces a wide variety of ways in which the load may be moved, since all of these telescoping members may operate independently of each other, thus making it possible to move the load in any desired direction.

For the purpose of handling containers, it is advisable to provide the load arm with a cable sling, the lower ends of the cables being fitted with locking members adapted to the container fittings.

In order that the transporting vehicle may be used on the road, it is important that the loading and unloading device shall be located within the outline of the vehicle. To this end, the double-ended lever, which forms a straight line, is made in two parts, and these may be made rigid or pivotable with respect to each other, making it possible to set the two parts at an angle to each other.

In order to make it possible for the loading operation, for example from a road vehicle to a track vehicle or to the ground, to be carried out anywhere, simple arrangements must be provided to ensure that the vehicle carrying the loading and unloading devices is supported on the ground in such a manner that large loads may be transferred without any difficulty.

In this connection it is essential to provide opposing bearings for the supporting rails or legs at the front and rear end of the vehicle, especially immediately behind the cross members carrying the bearings for the supporting tubes and booms.

If satisfactory stability is to be obtained, it is important that these telescoping supporting legs shall consist, in the operative position, of an inner part lying within the outline of the vehicle and an outer part projecting beyond the longitudinal sides of the vehicle. Building these supports in the form of an "A" ensures the rapid and safe transfer of containers. There is no need to bridge the vehicle or trailer. This ensures minimal transfer times.

In order to ensure stability, it is also important that the upper ends of the supporting legs be joined together in the operative position, for instance by guide bolts, whereas the lower ends are provided with bearing plates which swing automatically outwards. When the supporting legs are swung out, car is taken to ensure that a recess in one of the upper ends of the supporting legs locks into the guide bolts, the vehicle being thus supported on the ground, front and rear, by stands ensuring adequate stability.

In order to ensure at all times, when the vehicle is in the transporting condition, that these supporting parts do not project beyond the outline of the said vehicle, it is essential that the bearing plates be rounded off, and that the chassis of the vehicle be fitted with guide plates which pivot the supporting legs when the inner part thereof is pushed out.

This makes it possible to arrange these parts within the outline of the vehicle; upon being extended, they will be guided by guide plates which may be arranged, for example, above the vehicle fenders to prevent the latter from being damaged, while still allowing the bearing plates to rest upon the ground at a sufficient distance from the vehicle.

It is advisable to connect the said bearing plates to the outer supporting legs by means of springs, so that they are swung out into the operative position by spring force.

In this way, the supporting legs themselves seek a secure hold on the ground.

Simplified operation and construction is obtained if the booms, supporting tube, and hydraulic presses are arranged in the telescoping parts, or form the said telescoping parts.

It is also essential that the load arm be provided, for the transportation condition, with detachable or reversible means, known per se, for picking up the load, such as gripper arms, unloading devices, spreaders, etc.

It is of advantage to provide two pivoting cylinders, the lower ends of which are connected to the outer part of telescoping supporting tube, on both sides thereof.

A common hydraulic system for these pumping cylinders makes it possible to prevent the hydraulic oil from being pumped around when pivoting is carried out over the dead point. The two pivoting cylinders engage at an angle, at the joint upper connecting point, with the power end of the lever, so that sufficient power is always available even at top dead center. Since the lower ends of the pivoting cylinders are connected to the outer part of the supporting tube, the said distance is kept constant in a simple manner.

In order to reduce the outside dimensions of the device, which is an advantage when the vehicle is being transported, it is preferable to make the load arm collapsible. The load arm is collapsed for transportation.

Collapse of the load arm may be effected by means of a hydraulic cylinder with locking hooks fitted to the load arm. The hydraulic cylinder pivots the collapsible part of the load arm, and the locking hooks lock the part in the straight-line or collapsed position.

Specially designed supporting tubes (stabilizers) may be provided to absorb the suspension, frictional, and wind forces acting longitudinally. In this connection, each supporting tube consists of two individual stabilizers running parallel with each other, the outer parts thereof being connected at the bottom by means of the pivoting-cylinder mounting. The outer parts thus from the upper parts of the stabilizers, the inner parts being hinged to the chassis of the vehicle. With this double-stabilizers design means that the cylinders absorb only tension and compression forces.

For the purpose of compensating for ground irregularities, it is preferred to provide separately controllable, hydraulically extensible supporting cylinders, located externally of the boom supports on the chassis, on which the vehicle chassis rests. Supporting cylinders of this kind make is possible to compensate for relatively large differences in height (for example 300 mm). They are attached to the chassis of the vehicle after the manner of gantries. Separate control of the four cylinder arrangements makes satisfactory adaptation to ground irregularities possible.

Whereas in the device already proposed, the two loading and unloading devices are displaceable in the longitudinal direction of the vehicle, it is preferred according to the invention, in order to make it possible to adapt the device to loads of various sizes, to join the two loading and unloading devices together by means of a top-unloading device displaceable in its pick-up parts. This top-unloading device or spreader comprises, for example, longitudinally displaceable carriages having gripping and attaching devices for the load, the said devices being driven by separate motors.

The loads or containers picked up are locked to the spreader by means of cylinders or folding gripper tongs and can thus be transferred.

The invention, the configurations thereof already described, and additional configurations are described hereinafter in greater detail with the aid of the examples of embodiments illustrated in the attached drawings, wherein:

FIG. 1 shows a device according to the invention in one phase of the loading operation at the side of a track vehicle;

Figure 6:
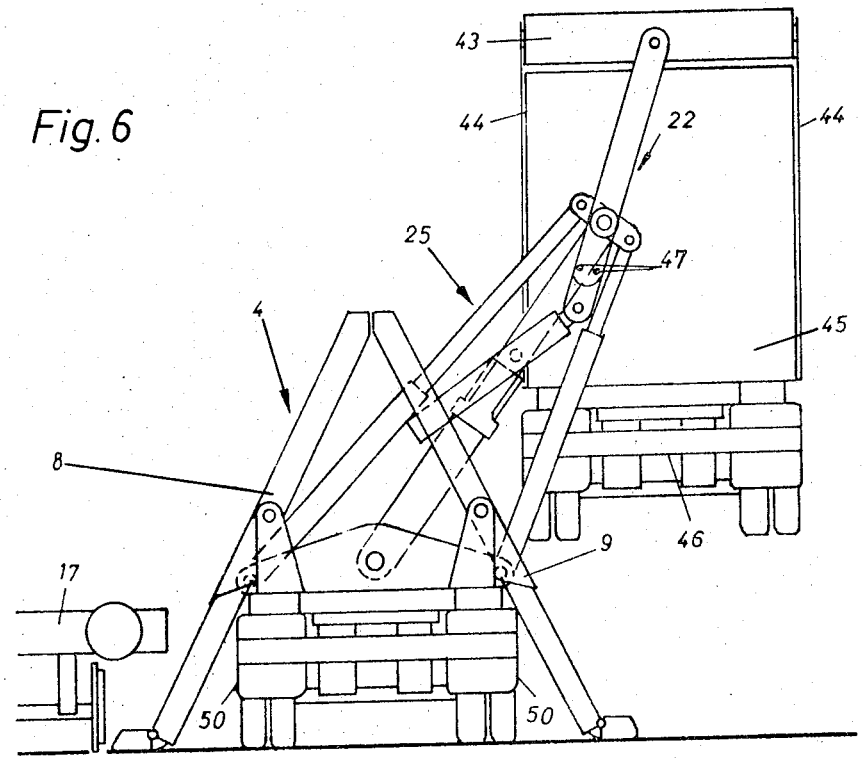
Figure 2:
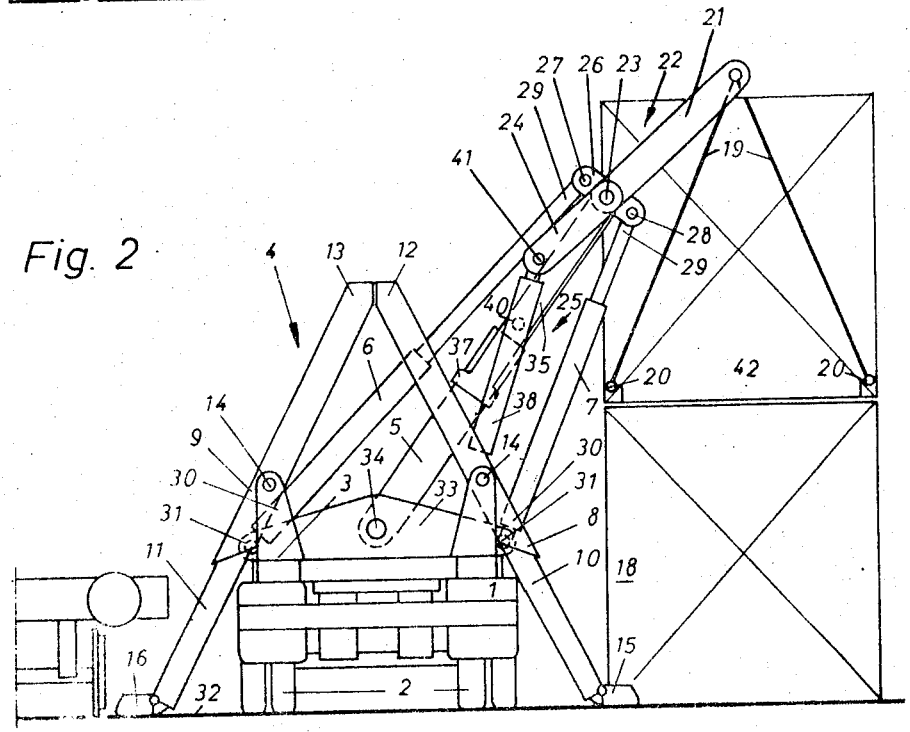
FIG. 2 shows a phase of the unloading operation, namely the stacking of an arrangement according to FIG. 1; placing the load upon another load.
Figure 5:
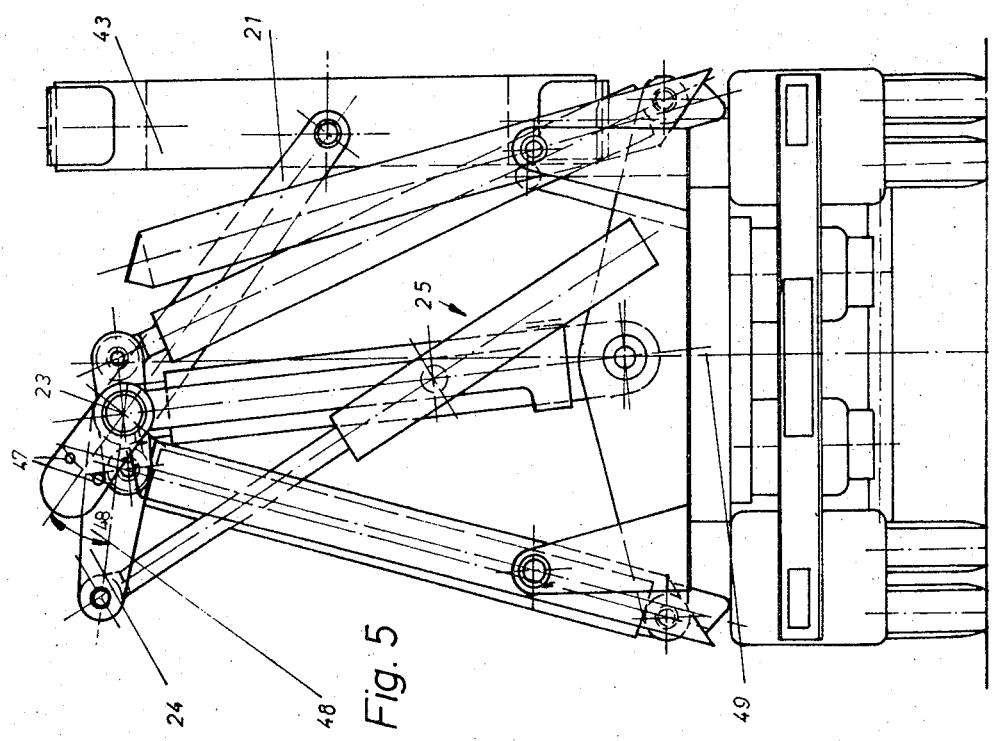
FIG. 5 shows a device with a different load-pick-up device ready for travelling.
Figure 7:
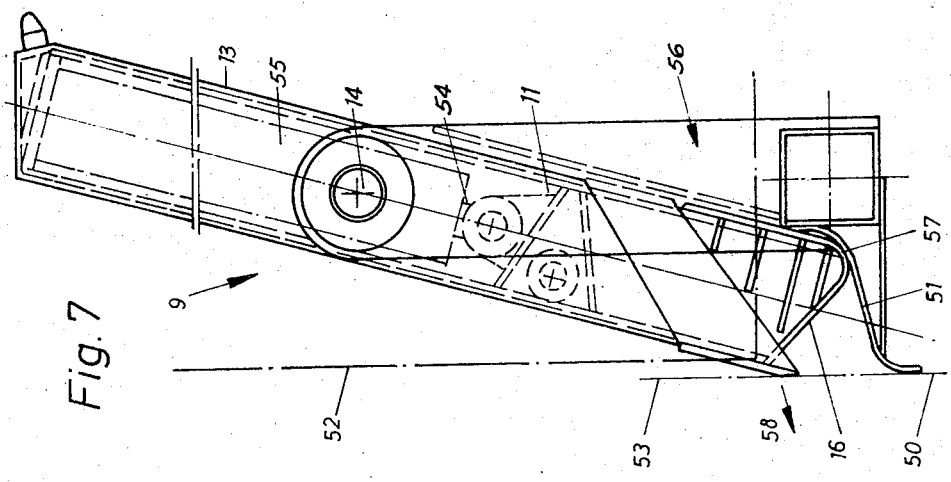
Figure 10:
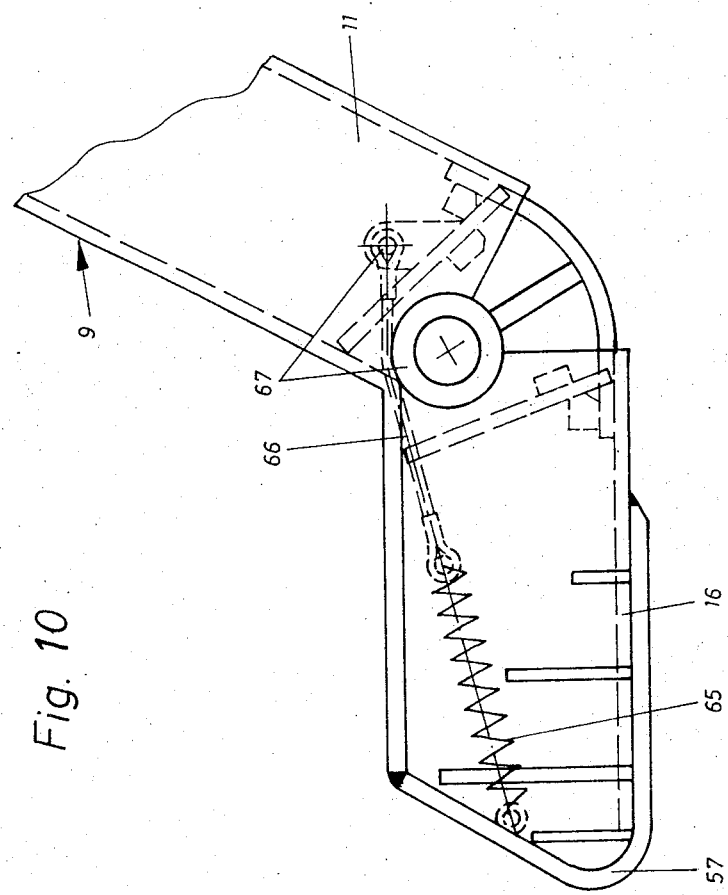
Figure 8:
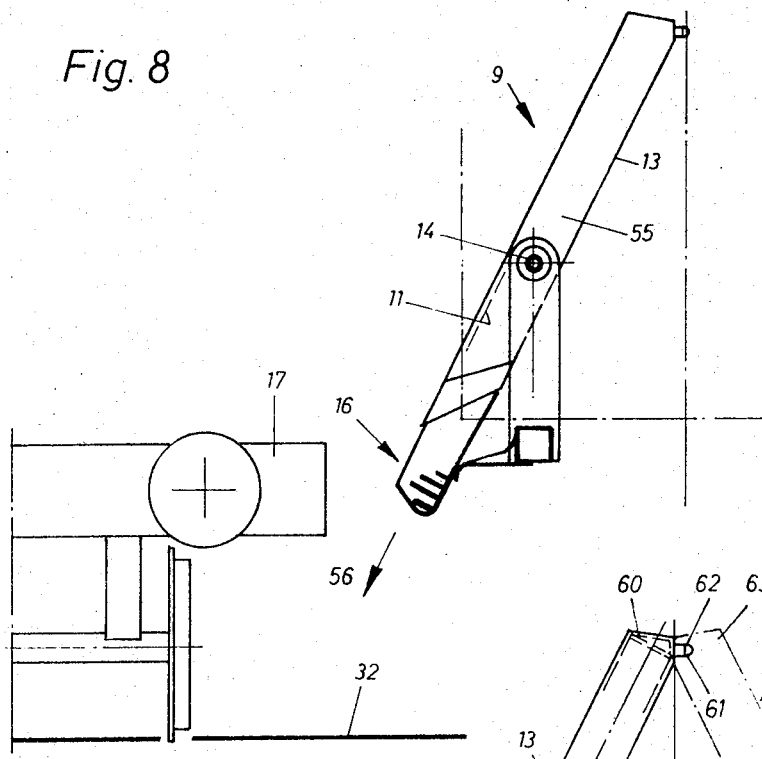
Figure 9:
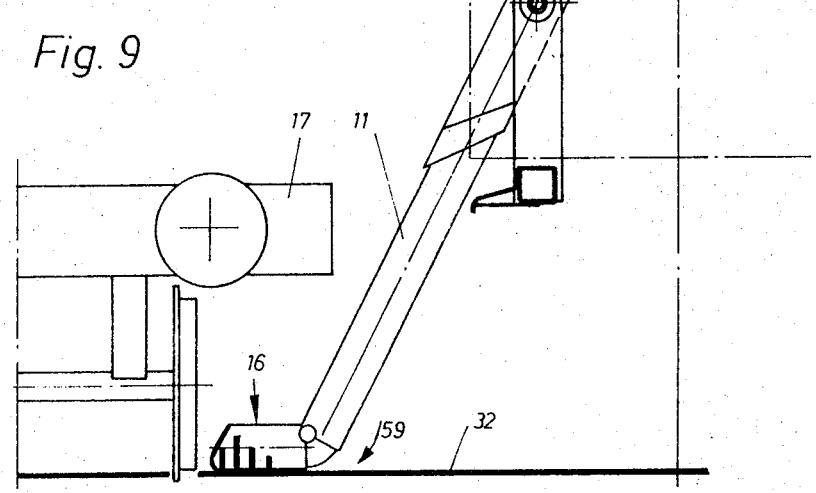
Figure 11:
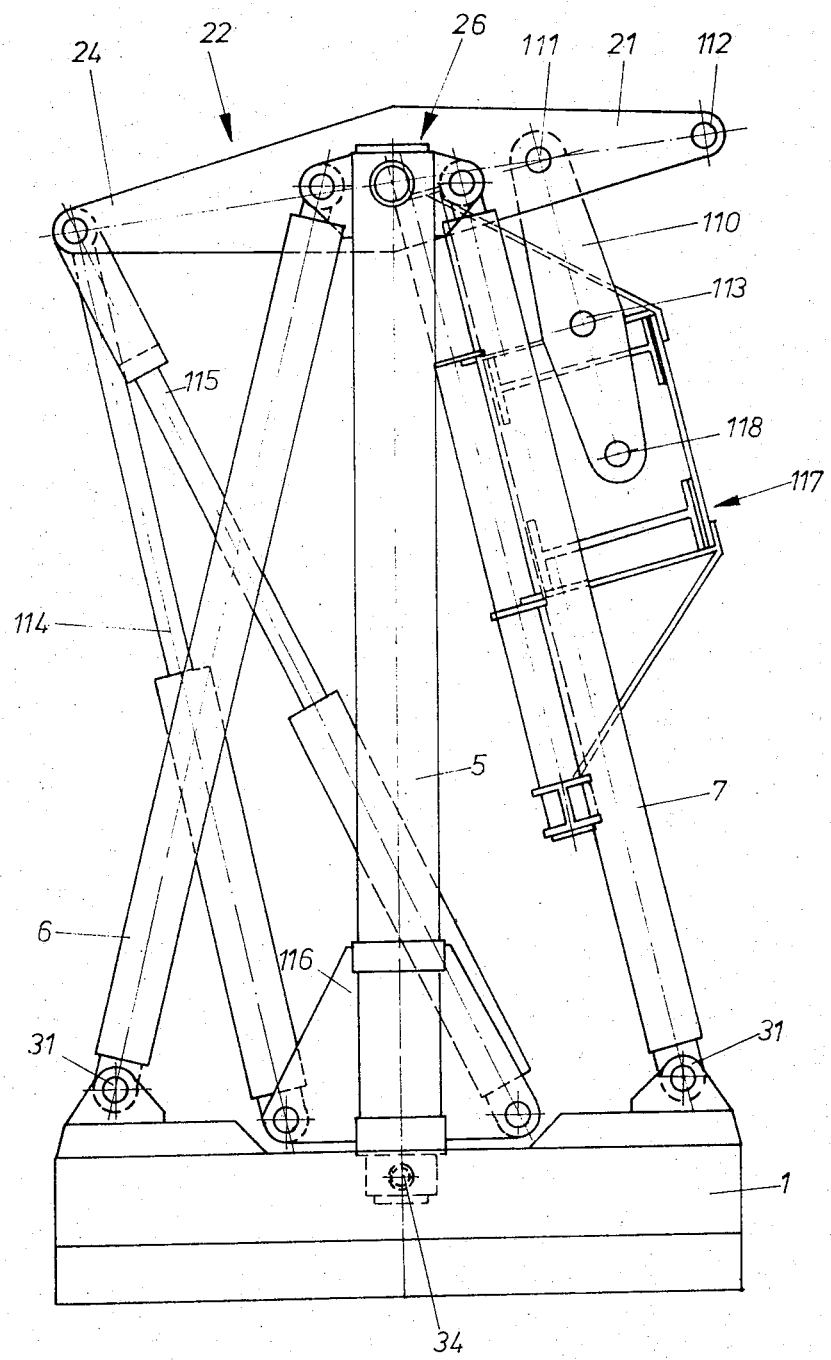
Figure 12:
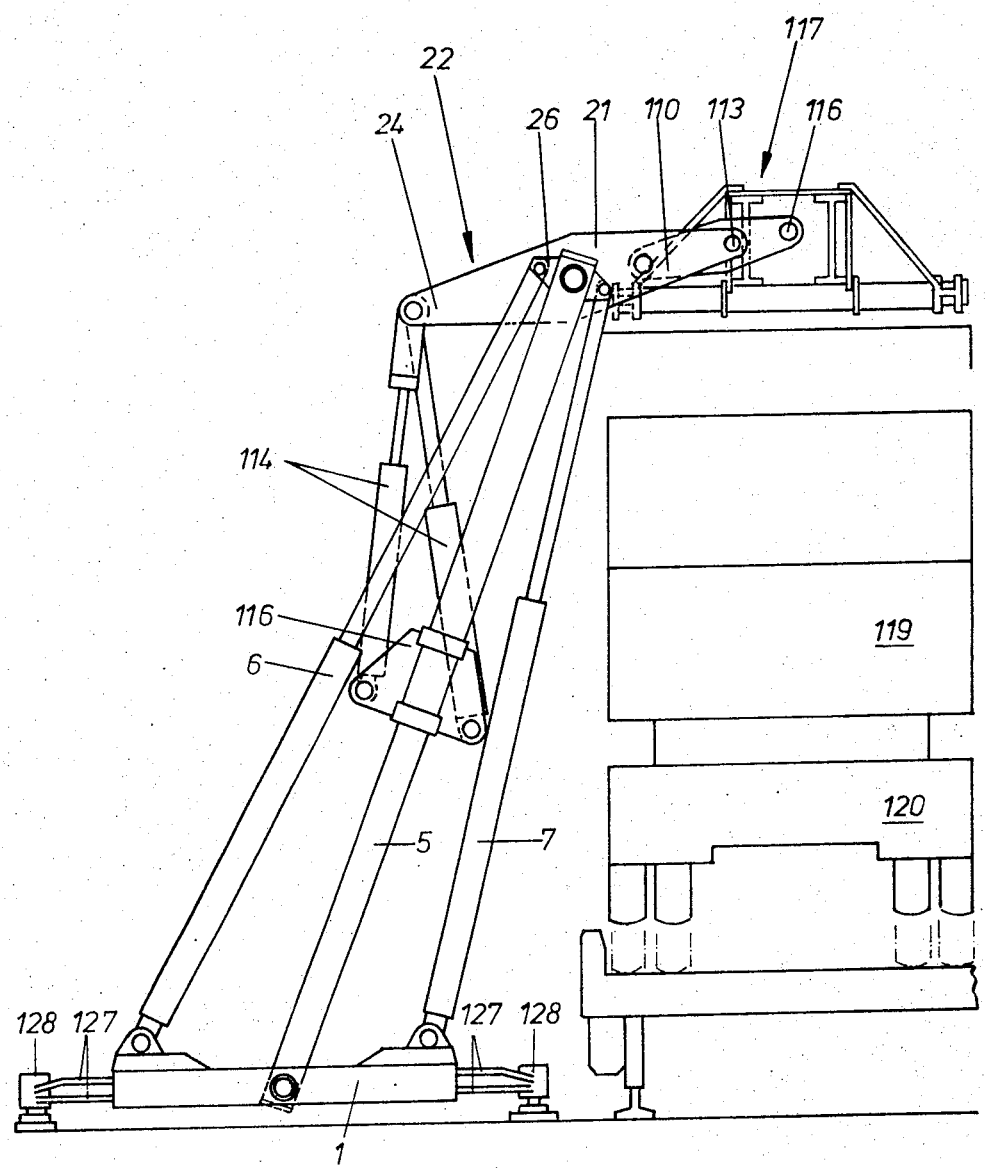
Figure 13:
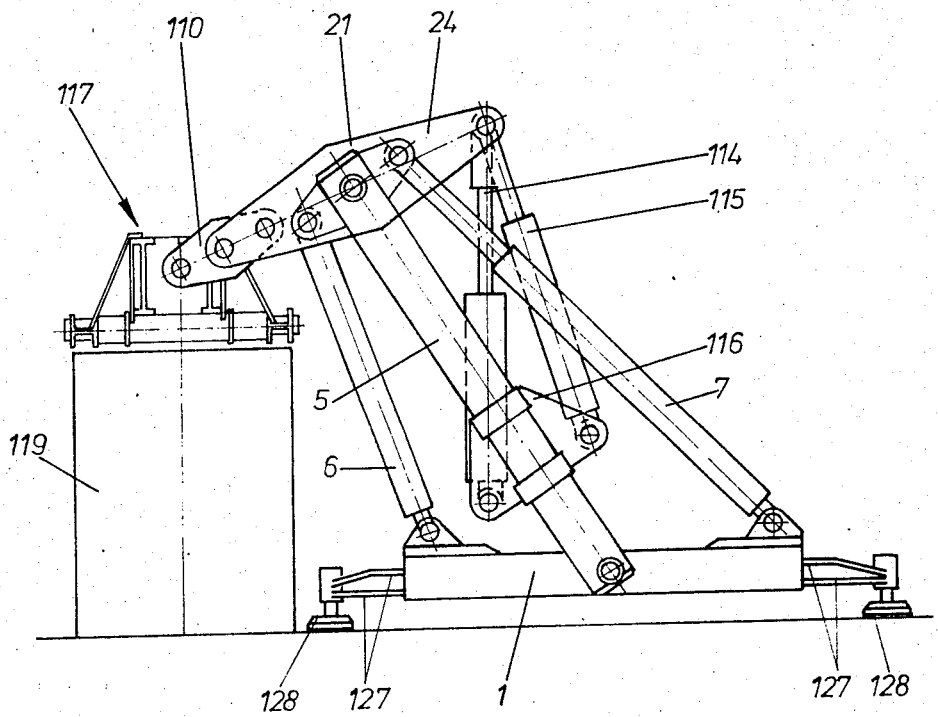
Figure 14:
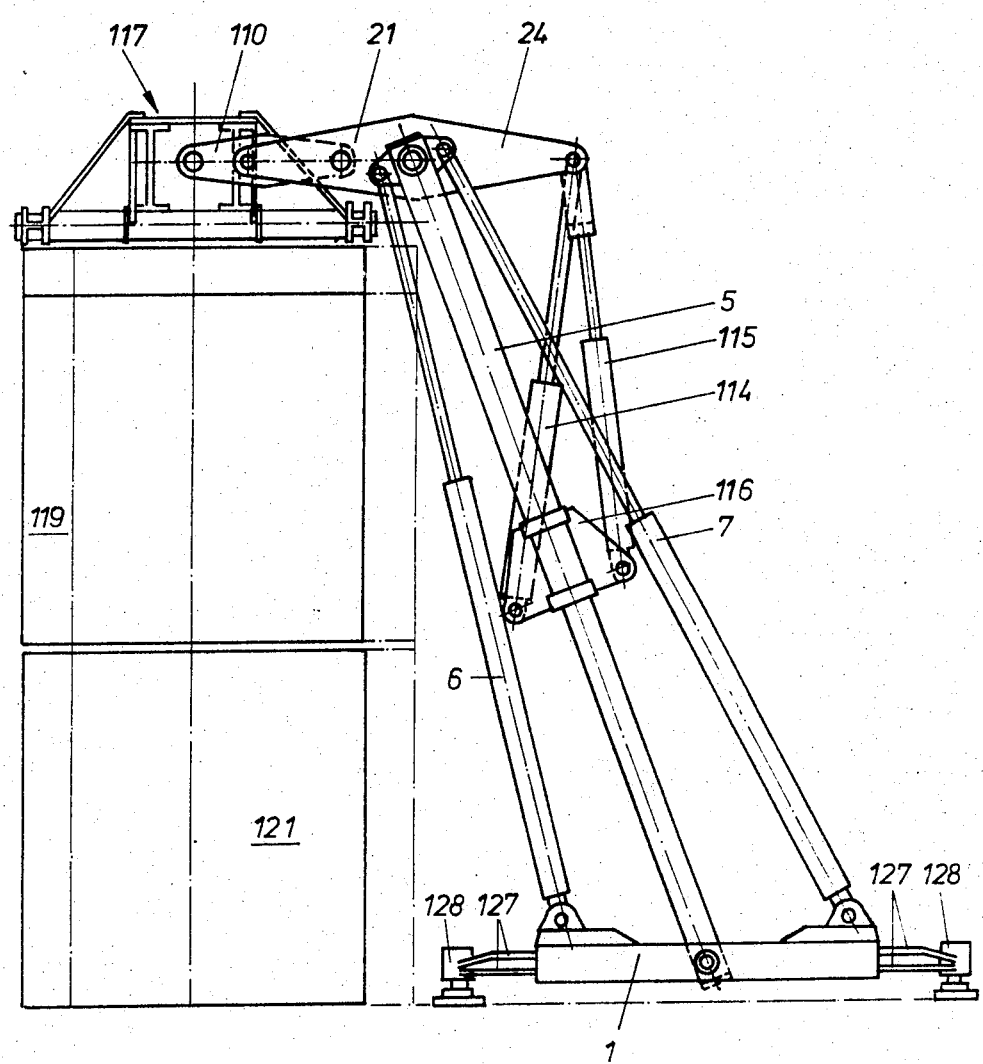
Figure 15:
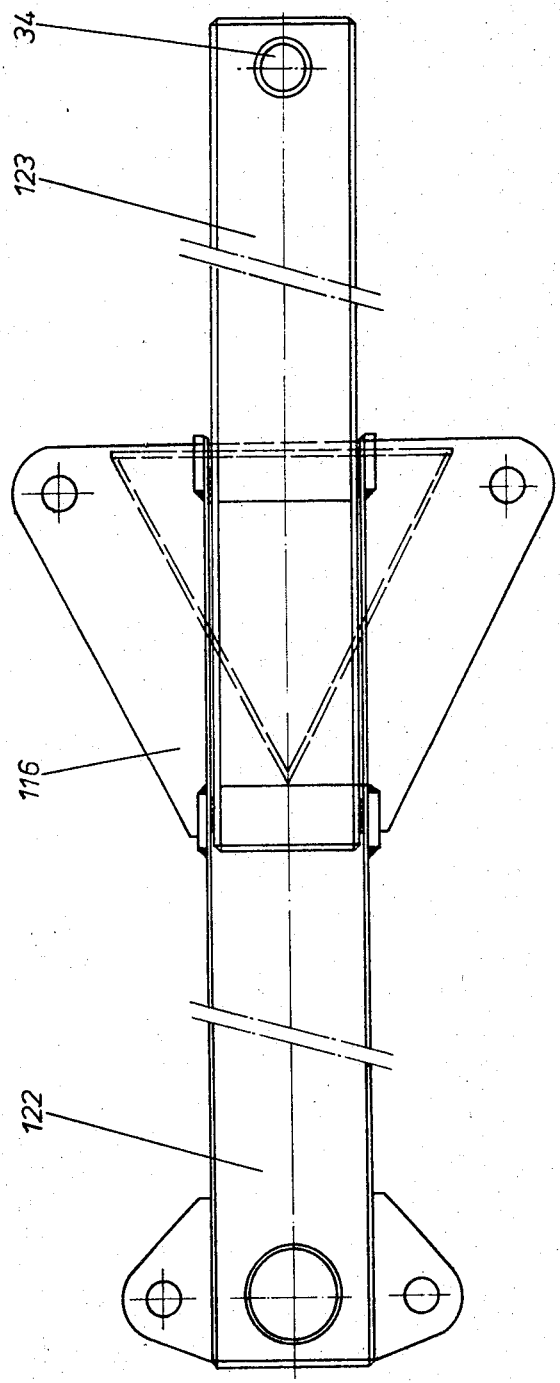
Figure 16:
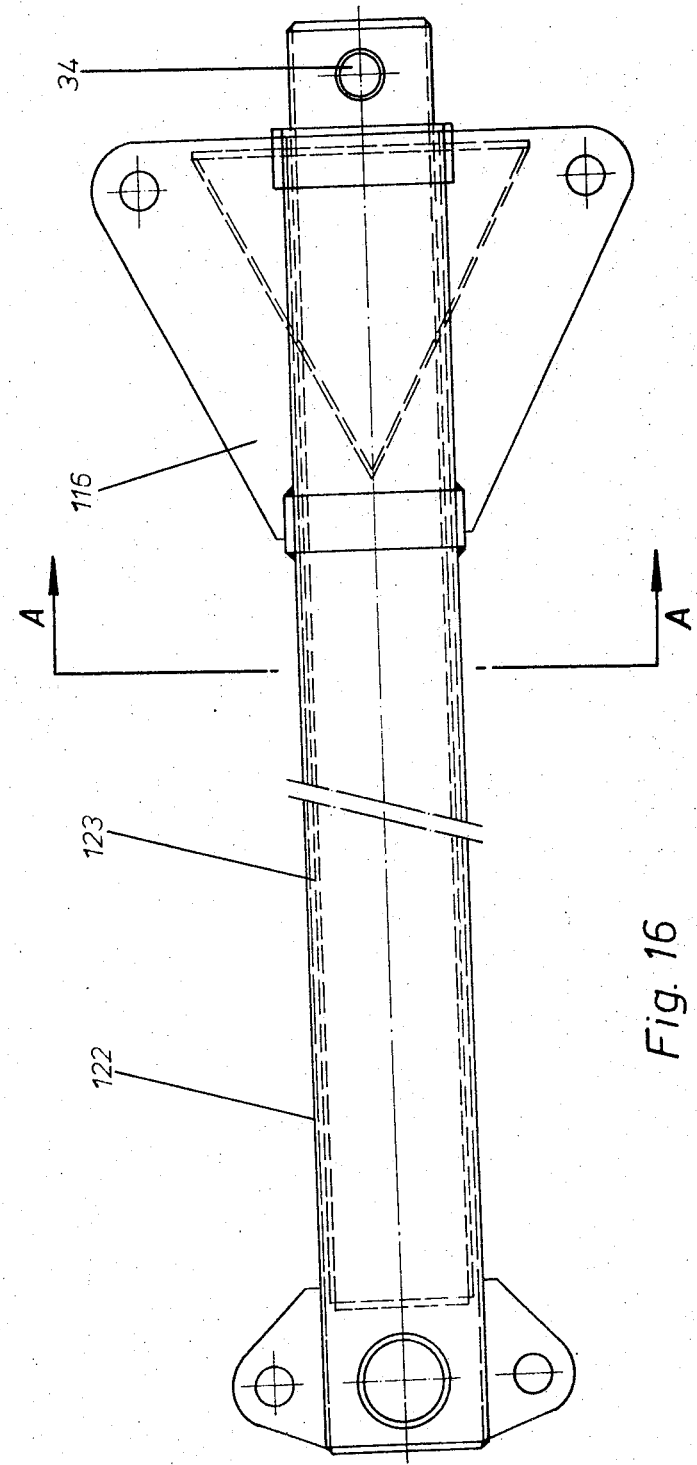
Figure 17:
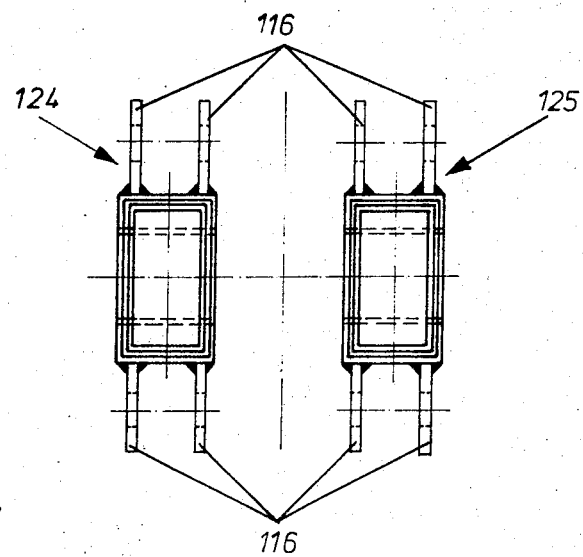
Figure 22:
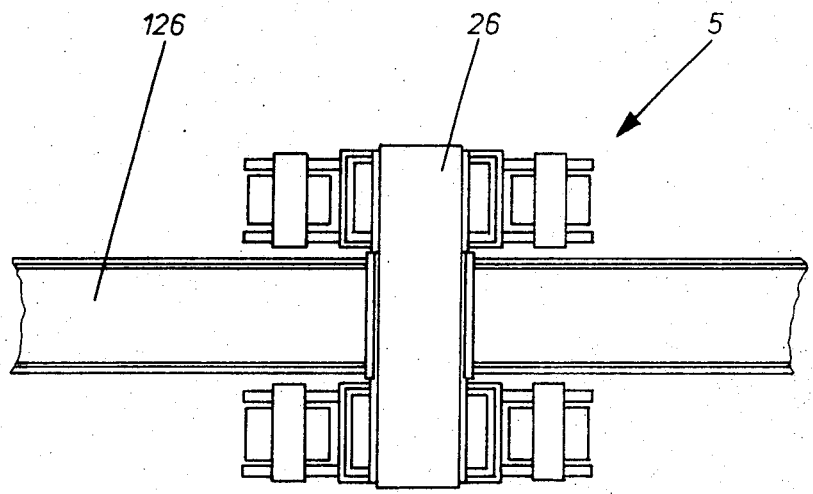
Figure 18:
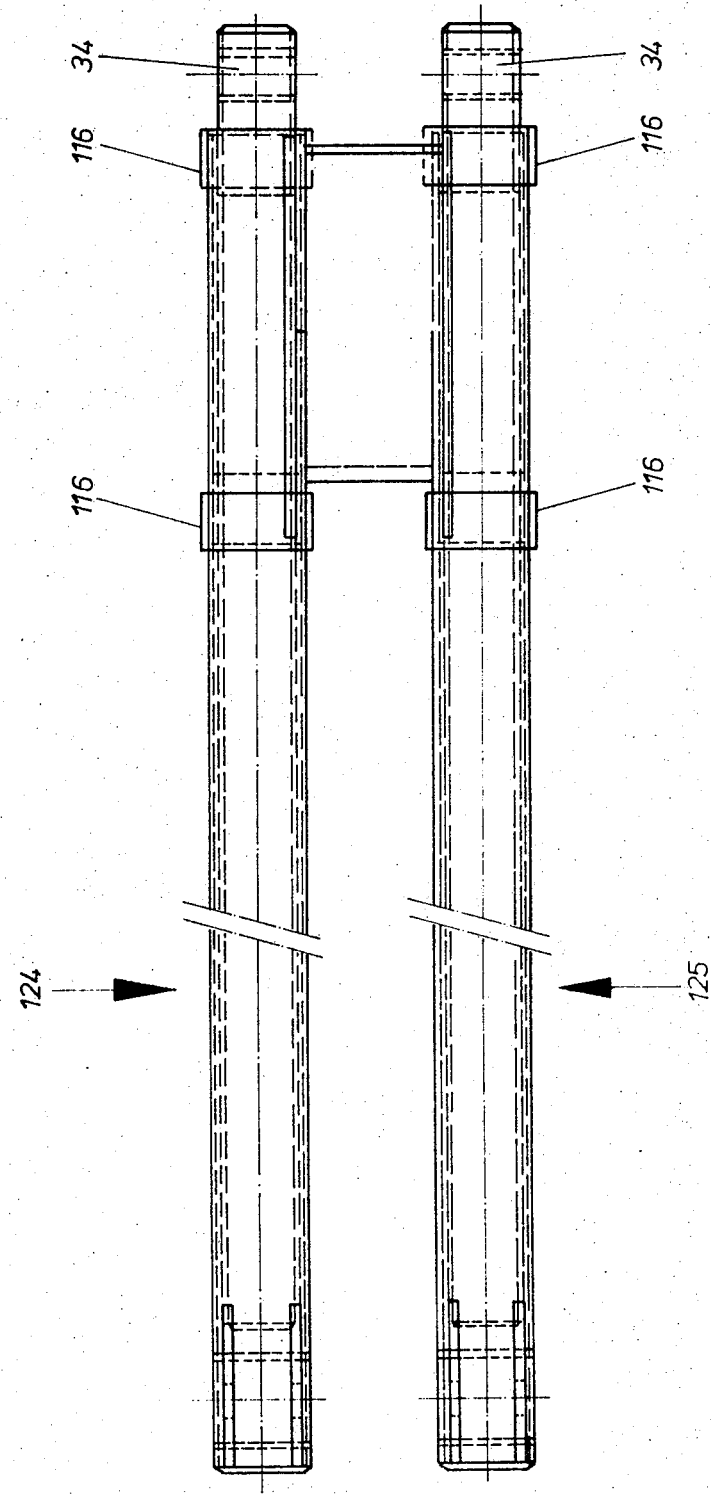
Figure 19:
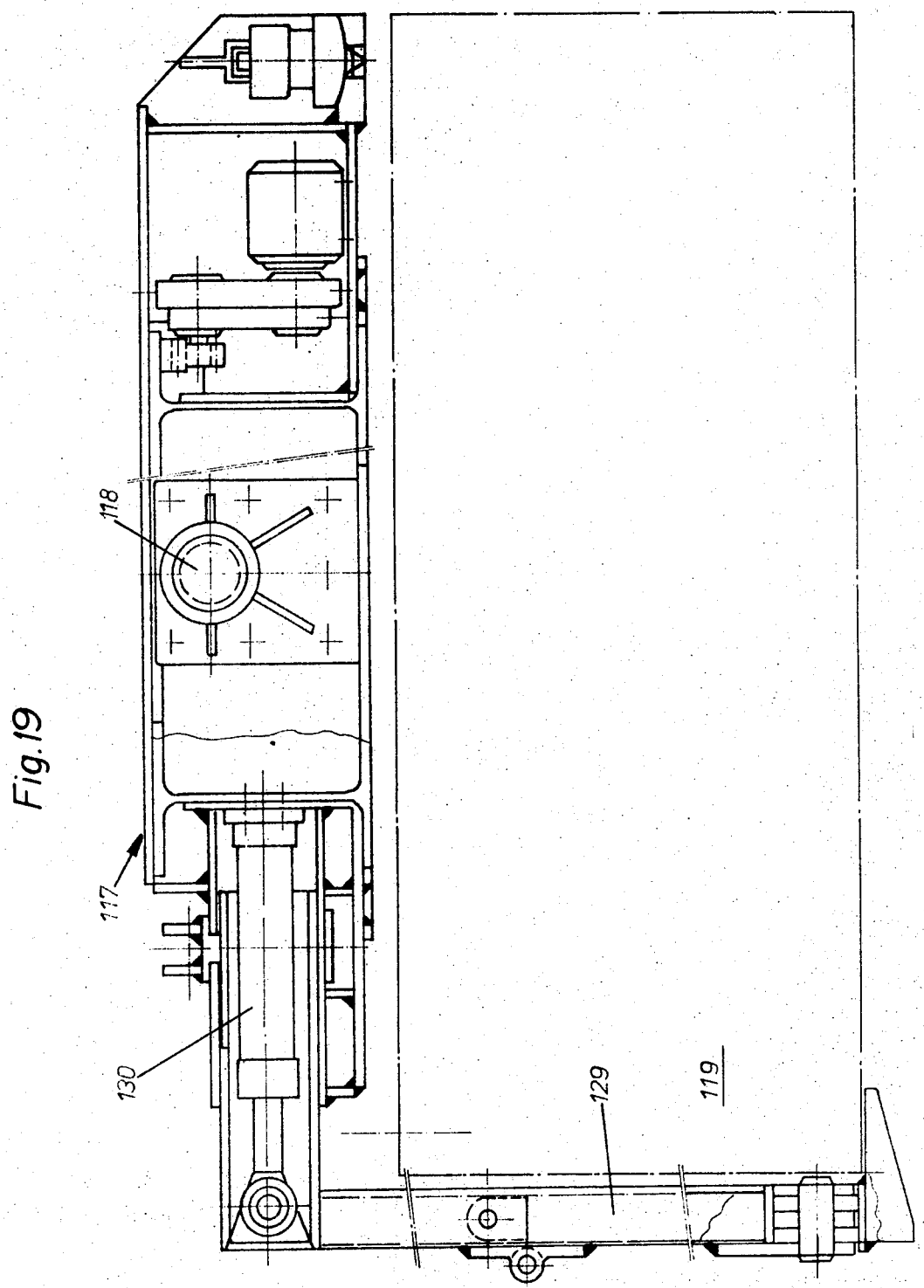
Figure 20:
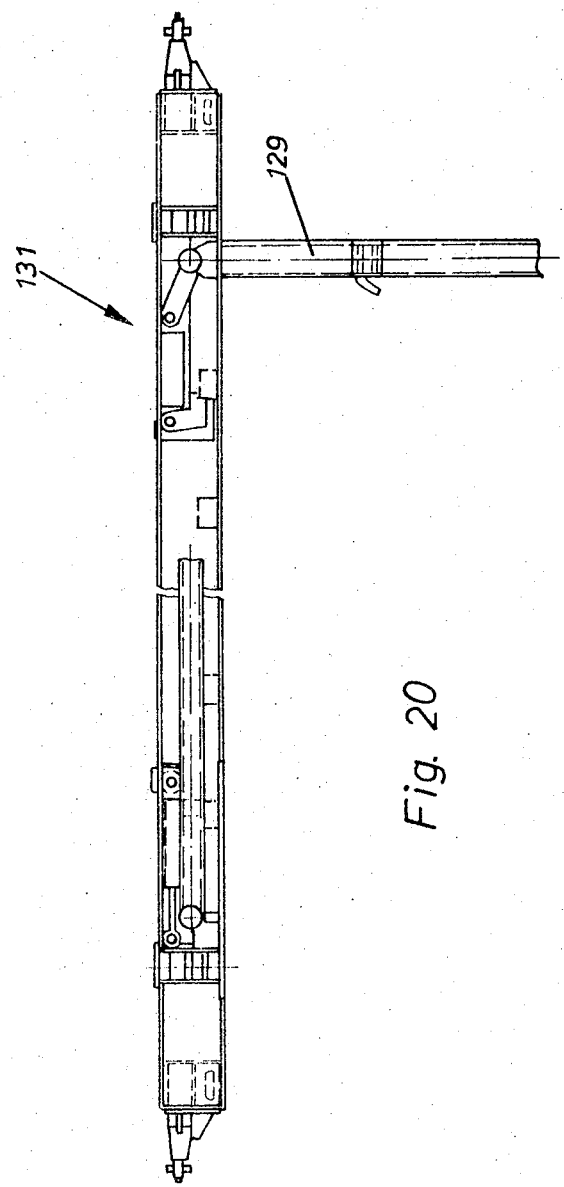
Figure 21:
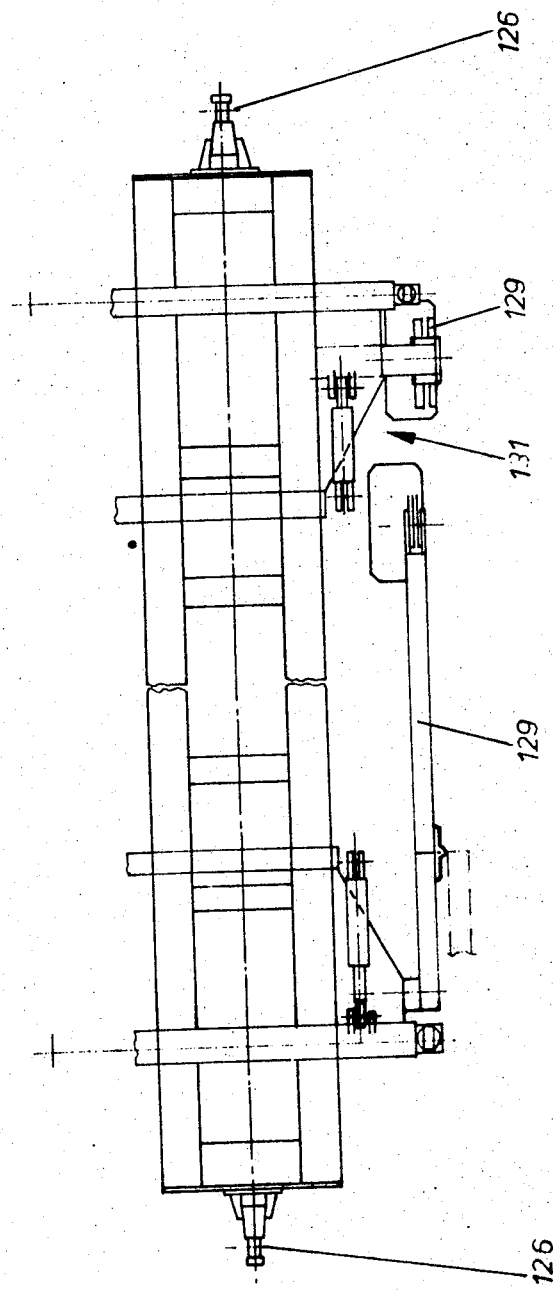

FIG. 6, on the same sheet as FIG. 2, shows one phase of the loading operation with a device according to FIG. 5;

FIG. 7 is a detail showing the start of the extension of a supporting leg;

FIG. 8 shows another phase of the extension of the supporting leg according to FIG. 7;

FIG. 9 shows the supporting leg according to FIG. 7 fully extended, with the bearing plate in position;

FIG. 10 on the same sheet as FIG. 7, is a detail of the connection between the bearing plate and the supporting leg according to FIG. 7;

FIG. 11 is a modified load-pick-up device seen from the front end of a transporting vehicle in the travelling position;

FIG. 12 shows the device according to FIG. 11 lifting a load from a flat-bed vehicle;

FIG. 13 shows the device according to FIG. 12 with the loading apparatus pivoted towards the left to place a container on the ground;

FIG. 14 resembles FIG. 13, but shows containers being stacked;

FIG. 15 shows a supporting tube in the extended position;

FIG. 16 shows the supporting tube in FIG. 15 retracted;

FIG. 17 is a section along the line A-A in FIG. 16;

FIG. 18 is a side elevation of the supporting tube according to FIG. 16 showing the two individual stabilizers;

FIG. 19 is a front elevation of the spreader used in the device with the pendant gripper device holding a schematically indicated load;

FIG. 20 is a longitudinal view of the spreader according to FIG. 19;

FIG. 21 is a plan view of the spreader according to FIGS. 19 and 20;

FIG. 22, on the same sheet as FIG. 17, is a section through the head of the upper supporting tube.

FIG. 1 shows a transporting vehicle 1 with its chassis 2 and its loading surface 3. The loading and unloading device 4 at one end of the vehicle is complemented by another loading and unloading device, not shown, at the other end of the vehicle. The load is located between these two loading and unloading devices. In a manner known per se, at least one of the loading and unloading devices may be moved in the direction of the longitudinal axis of the vehicle, for adaptation to loads of different lengths. Supporting tube 5 is arranged between two telescoping booms 6 and 7 in the form of hydraulic cylinders. Supporting legs 8 and 9 consist of extensible outer parts 10, 11 and inner parts 12, 13, the said supporting legs 8, 9 being connected to the chassis of the vehicle by bearings 14. Arranged at the end of outer parts 10, 11 of the supporting legs are bearing plates 15, 16. In the example shown, load 18 is being unloaded from a track vehicle 17, the said load 18 being suspended from a sling 19 connected to the said load by locking members 20. The weight of the load 18 is transferred by load arm 21 of double-ended lever 22 from the free end to bearing 23. Power arm 24 of the said double-ended lever 22 is connected to displacing device 25. Bearing 23 is arranged in head 26, the two ends of which carry bearings 27, 28 to which the top ends of booms 6 and 7 are hinged. Bottom ends 30 of these booms 6, 7 are connected to cross member 33 by bearings 31. Cross member 33 is at right angles to the length of the vehicle and also carries bearing 34 which connects the bottom end of supporting tube 5 to the chassis of the vehicle. The said supporting tube 5 has a bearing bracket 35 mounting a hydraulic cylinder 38, piston rod 39 of which is connected to bearing 41. A guide tube 37 for bearing bracket 35 serves to transfer the pressure to supporting tube 5. Displacing device 25 consists of hydraulic cylinder 38 and piston 39 which is caused to move in the cylinder by pressure. Bearing 40, which retains hydraulic cylinder 38 on bearing bracket 35 and supporting tube 5, is positioned in a manner such that when load arm 22 is pivoted from one side of the vehicle to the other, the displacing device 25 can follow through as described further below in connection with FIG. 2. As a result of this there is no deadpoint when the load is moved in this way. A maximum of stability is assured by bearing plates 15, 16 lying on the ground 32 and by the supporting legs forming an "A".

FIG. 2 shows the device according to FIG. 1 in the stacking position. It may be seen that hinged connection 41 of displacement device 25 can swing through with double-ended lever 22 according to the choice of the position of bearing 40. This makes it possible to stack container 18 and 42 right beside transporting vehicle 1.

Figure 3:
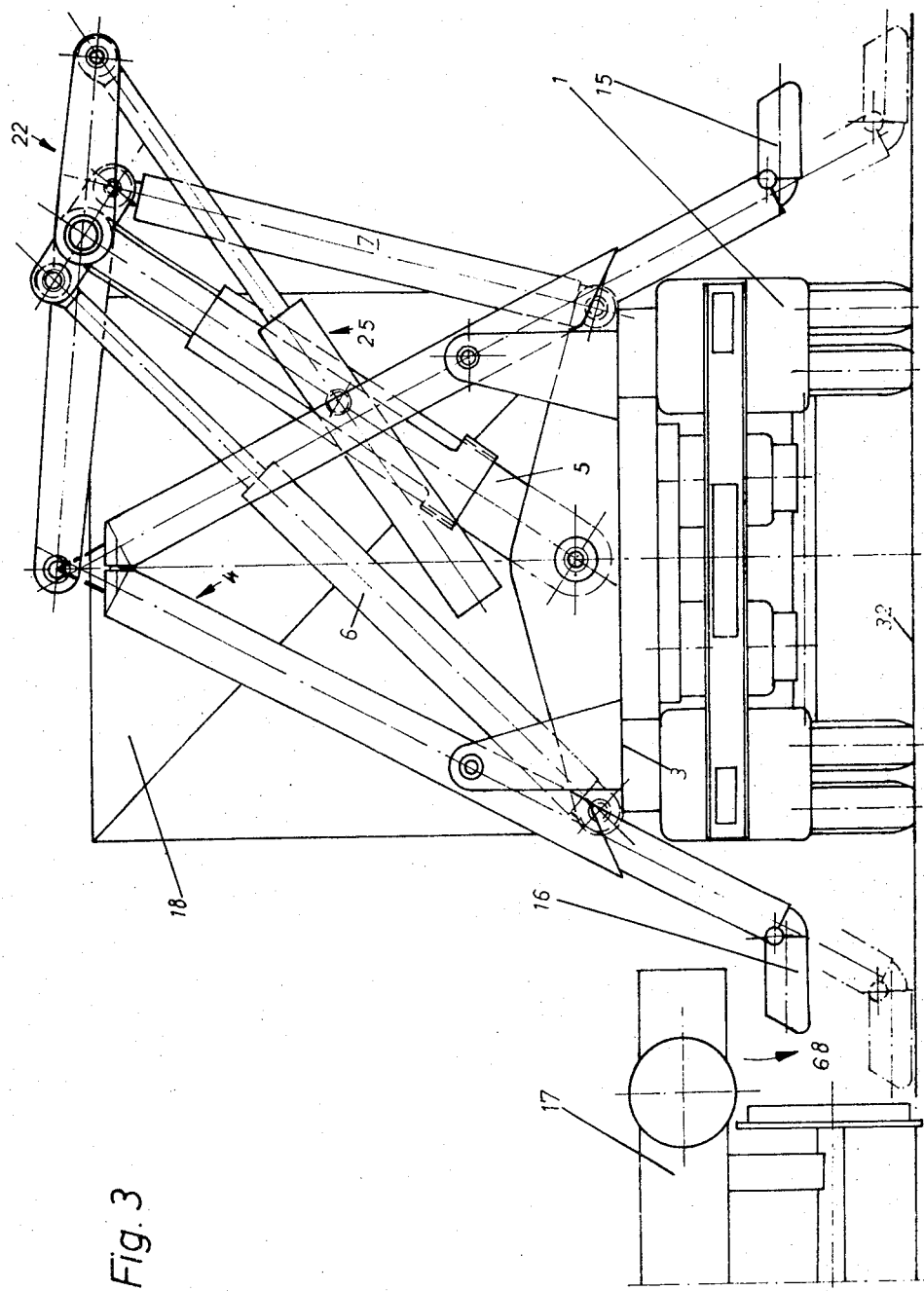
FIG. 3 shows another phase of the loading operation, namely the placing of a load on the vehicle and the retraction of the supporting legs.
Figure 4:
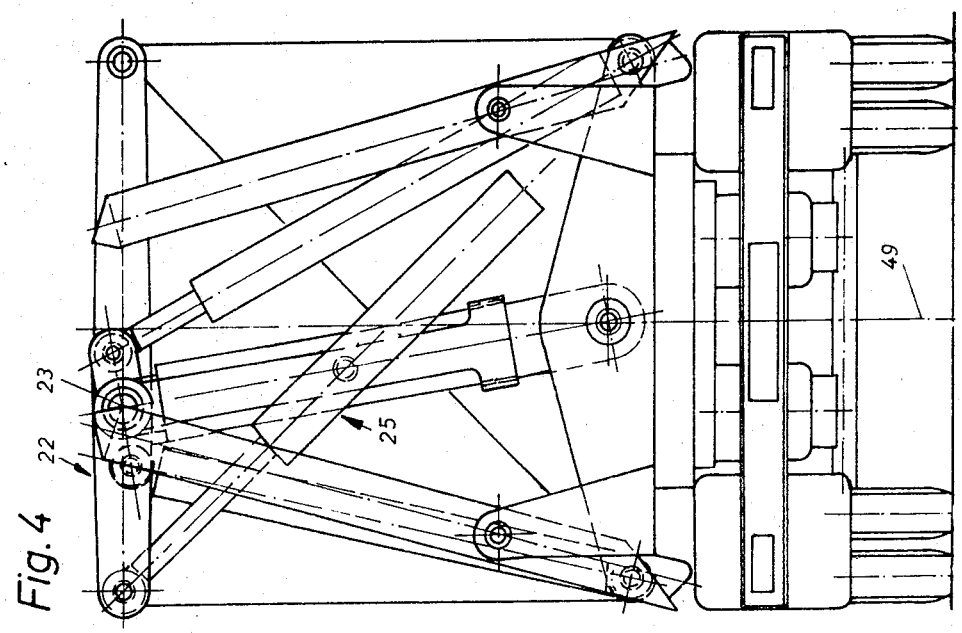
FIG. 4 shows the device in FIG. 1 ready for travelling.

FIG. 3 shows the device passing from the operative position shown in FIG. 2 to the travelling position shown in FIG. 4. This travelling position may also be assumed when load 18 is transported on vehicle 1. As may be seen by a comparison with FIG. 4, bearing plates 15, 16 then form extensions to supporting legs 8, 9.

The travelling position illustrated in FIG. 5 relates to another configuration of the invention. In this figure, parts having the same functions as in FIGS. 1–4 bear the same reference numerals. In the device according to FIG. 5, a top-unloading device 43 known per se is hinged to load arm 21 so that, as shown in FIG. 6, an entire transporting vehicle 45 with its chassis 46 can be transferred from the road to a track vehicle 17 by means of gripper arms 44.

In order to confine device 43, in its travelling position, within the outline of the vehicle, double-ended lever 22 is made in two pieces connected together, for example, by means of a plug-in connection 47 (FIG. 6).

When this connection is released, the two parts forming double-ended lever 22 may be pivoted in a manner such that they are at an angle 48 (FIG. 5) to each other. This reduces the distance between device 43 and center line 49 of the vehicle.

The fact that it is possible, with a road vehicle of little width and height in the travelling condition, to lift loads to a considerable height, and to pick up and set down loads right next to the vehicle, is due mainly to the trestle-like support provided by the supporting rails or legs 8, 9. This kind of support is therefore necessary if a displacing device is to be used to pick up and deposit tall loads at a short distance from longitudinal sides 50 of the vehicle.

FIGS. 7 – 9 show the extension and retraction of the device in FIG. 5.

FIG. 7 shows guide plates 51 arranged at longitudinal sides 50 of the vehicle, for instance covering the fenders of transporting vehicle 1. Dotted line 52 is intended to indicate the outline of the load, while line 53 indicates the overall width of the vehicle. Now if outer part 11 of the supporting leg, which is to be moved outside the periphery of the vehicle, is pushed in the direction of arrow 56 by piston 54 and pressure cylinder 55 out of inner part 13 of the said supporting leg, then rounded-off part 57 of bearing 16, and guide plates 51, will cause supporting leg 9 to swing in the direction of arrow 58 about bearing 14. This produces the position shown in FIG. 8. Further extension in the direction of arrow 56 causes bearing plates 16 to swing in the direction of arrow 59 under the tension of spring 65 (FIG. 9, 10). If extension is continued still further in direction 56, bearing plate 16 eventually comes into contact with the ground 32, causing locking pin 62 in upper end 60 of leg 9 to enter recess 61 in leg 8. From the static and structural point of view, "A"-shaped stand 64 thus produced is an optimal design for preventing the vehicle from tilting. Although this stand is high and very stable, the design of supporting legs 8, 9 makes it possible to keep the outline of the vehicle in the travelling condition low and relatively narrow.

FIG. 10 also shows that bearing plate 16 is connected to outer part 11 of supporting leg 9 by means of a spring 65, and cable 66, and a deflection roller 67.

It will be seen from FIG. 3 that when bearing plate 16 rubs on parts of track vehicle 17, it will swing in the direction of arrow 68 like a toggle switch, i.e. bearing plate 16 will be in a straight line with outer part 11 of the supporting leg.

If the displacing device is suitable designed and arranged, the device according to the invention makes it possible to swing lever 22 through about 270° without any appreciable deadpoint position.

The load pick-up device according to FIG. 11 has the basic structure of the devices described hereinbefore, and the parts thereof therefore bear the same reference numerals.

Load pick-up devices according to FIG. 11 are provided at each end of chassis 1 of the vehicle, not otherwise shown. The same devices consist of a central telescopically extending supporting tube 5, with telescoping booms 6, 7, in the form of hydraulic cylinders, on each side.

The upper end of supporting tube 5 is hinged to connecting piece or head 26, to which are also hinged the upper ends of booms 6, 7. The lower hinges of booms 6, 7 are again marked 31, and the lower end of supporting tube 5 is marked 34. Additional details of supporting tube 5 will be explained later in connection with FIGS. 15 to 17.

Also hinged to connecting piece 26 is a double-ended lever 22 consisting of a load arm 21 and a power arm 24. Load arm 21 has an extension 110 rotatably mounted at 111. Extension 110 is pivoted by means of a hydraulic cylinder and it may be locked in the positions shown in FIGS. 11 and 12 by means of locking hooks engaging at 112, 113.

Hinged to the outer end of power arm 24 are two pivotable cylinders 114, 115, the lower ends of which are connected to the outer tube of supporting tube 5, by means of a common connecting piece 116.

A spreader 117 is connected to extension 110 by means of a bearing 118. This spreader is explained in greater detail in FIGS. 19 to 21.

In FIG. 12, booms 6, 7 and supporting tube 5 are extended to raise a load 119 from a saddle trailer 120. Connecting piece 116 is also raised since it is connected to the lower end of the outer part of supporting tube 5. By retracting cylinders 114, 115, and retracting or extending booms 6, 7, load 119 may now be swung from the right to the left-hand side.

FIG. 13 shows by way of example a container 119 being placed on the ground, booms 6, 7 and supporting tube 5 having been swung to the left by suitable actuation of the hydraulic controls, while cylinders 114, 115 have been extended additionally outwards, so that the outer end of load arm 21 now extends farther downwards.

The position shown in FIG. 14 is similar to that in FIG. 13, except that a load 119 is being placed on an already deposited load 121. In this case, booms 6, 7 and supporting tube 5 are extended further but are not swung so far to the left, and cylinders 114 and 115 are closer in.

FIG. 15 is a detail of extended supporting tube 5 with connecting piece 116. Supporting tube 5 consists of an outer tube 122 and an inner tube 123. Connecting piece 116 is attached to the lower end of outer tube 122.

FIG. 16 shows supporting tube 5 in the retracted condition.

The two individual stabilizers 124, 125 forming the supporting tube are shown in FIG. 17. The lower ends of cylinders 114, 115 are mounted in the empty space between the two connecting pieces 116.

FIG. 18 is a side elevation of FIG. 7.

FIG. 22 is a section through the top of stabilizer head 26.

FIG. 12, 13, 14 also show supports 128 fitted to booms 127 consisting of separately controlled, hydraulically extensible supporting cylinders. Each support is a double support, with two feet lying one behind the other.

Spreader 117 is shown in detail in FIGS. 19 to 21. It comprises extensible and pivotable gripper arms 129. Loads 119 are locked by turning cylinders 130 and may thus be transferred. Gripper arms 129 are accommodated in carriages 131 which are moved hydromechanically in the longitudinal direction and may thus be set to the required length.

Gripper arms 129 may also be pivoted laterally and locked for transportation.

The invention may be used to build up any form of loading or unloading device on vehicles or platforms, i.e. mobile or stationary, for the purpose of transferring bulky objects easily and without a large crew.

In addition to the normal transfer of containers (by which is meant transferring the container without putting it down on the way), the invention also makes it possible to transfer complete units (saddle trailers with various types of body). This is made possible by maximal utilization of individual components.

The embodiments of the invention in which an exclusive property or privilege is claimed are defined as follows:

1. A loading and unloading device for bulky loads, e.g. finished structural components, large containers, and other heavy loads, and said device consisting of a loading and unloading device arranged in front of and behind the load on the loading surface of a transport vehicle, especially a road vehicle, the said loading and unloading device consisting of two telescoping booms, the upper ends of which are hinged together, while the lower ends are hinged on each side of the centerline of the vehicle, and also consisting of a telescoping supporting tube, the upper end of which is hinged to the upper ends of the said booms, while the lower end is hinged to the vehicle between the said booms, characterized in that a double-ended lever is pivotably mounted at the junction of the upper ends of the booms, one end of the said lever picking up the load and the other end being hinged to at least one pivoting element by means of which the one end of the lever may be swung from one loading and unloading side to the other.

2. A device according to claim 1, characterized in that the pivoting element is hinged to the supporting tube and can be moved along it.

3. A device according to claim 2, characterized in that a displaceable bearing bracket for the pivoting element is fitted to the supporting tube at its centerline, a guide tube transferring the compression forces and surrounding the supporting tube being arranged at the lower end of the said bearing bracket.

4. A device according to claim 3, characterized in that the upper end of the supporting tube is hinged to a head, to the two ends of which are hinged the upper ends of the booms, the double-ended lever being mounted therebetween, especially centrally.

5. A device according to claim 4, characterized in that a displacing device is fitted to the short arm, i.e. the power arm, of the lever, while the load is picked up by the longer arm i.e. the load arm.

6. A device according to claim 4, characterized in that the load and/or power arm of the double-ended lever is adapted to telescope.

7. A device according to claim 5, characterized in that a cable sling is attached to the load arm, the lower ends of the cable being fitted with locking devices adapted to the container fittings.

8. A device according to claim 5, characterized in that the lever, forming a straight line, is made in two parts which, when the device is in the travelling condition, are pivotable to each other.

9. A device according to claim 2, characterized in that the bearing for the lower ends of the booms and the supporting tube are arranged on a cross member.

10. A device according to claim 9, characterized in that at least one of the loading and unloading devices is displaceable along the longitudinal axis of the vehicle.

11. A device according to claim 1, characterized in that opposing supporting bearings for telescoping supporting legs are provided at the front and rear ends of the vehicle, especially directly behind the cross members.

12. A device according to claim 11, characterized in that the telescoping supporting legs form in the operative position a trestle consisting of the inner parts of the supporting legs located within the outline of the vehicle, and the outer parts of the supporting leg projecting beyond the longitudinal sides of the vehicle.

13. A device according to claim 12, characterized in that the upper ends of the supporting legs are joined together in the operative position, for example by means of locking pins, while the lower ends are fitted with bearing plates which swing out automatically.

14. A device according to claim 1, characterized in that the bearing plates are rounded off, while the chassis of the vehicle is provided with guide plates which pivot the supporting leg about the bearing point when the outer part of the said supporting leg is extended.

15. A device according to claim 11, characterized in that the supporting leg bearing is also a pivoting bearing.

16. A device according to claim 13, characterized in that the bearing plates are hinged to the outer supporting leg by springs, and that they are swung into the operative position by spring force.

17. A device according to claim 13, characterized in that the upper end of one supporting leg exhibits a locking pin, while the upper end of the other supporting leg has a recess which engages the locking pin when the said legs are swung out into the operative position.

18. A device according to claim 3, characterized that the head is made to telescope by means of a supporting tube.

19. A device according to claim 13, characterized in that an hydraulic press for extending the outer supporting leg is accommodated in the inner supporting leg.

20. A device according to claim 5, characterized in that the hydraulic presses are arranged in the telescoping parts.

21. A device according to claim 5, characterized in that gripper arms are fitted to top-unloading devices such as, spreaders, which are fitted in turn to the load arm.

22. A device according to claim 1 characterized in that hydraulic presses are multi-stage double-acting hydraulic cylinders with press pistons.

23. A device according to claim 2, characterized in that two pivoting cylinders are provided, the lower ends of which are connected to the outer part of the telescoping supporting tube, on each side thereof.

24. A device according to claim 1, characterized in that the load arm is collapsible.

25. A device according to claim 24, characterized in that a hydraulic cylinder with locking hooks is provided on the load arm.

26. A device according to claim 23, characterized in that the supporting tube consists of two individual stabilizers running parallel with each other, the outer parts thereof being joined together at the bottom by the pivoting-cylinder mounting.

27. A device according to claim 1, characterized in that separately controlled, hydraulically extensible supporting cylinders, supporting the chassis of the vehicle, are provided externally of the supports for the booms.

28. A device according to claim 1, characterized in that two loading and unloading devices are joined together by a top-unloading device, the pick-up parts of which are displaceable.

29. A device as defined in claim 25, wherein the top-unloading device has longitudinally displaceable carriages with gripper and attachment devices.

* * * * *

Disclaimer

3,726,421.—*Alois Goldhofer*, Amendingen, Germany. LOADING AND UNLOADING DEVICE. Patent dated Apr. 10, 1973. Disclaimer filed June 3, 1974, by the inventor.

Hereby enter this disclaimer to claim 25, of said patent.

[*Official Gazette October 15, 1974.*]